(12) United States Patent
Edri et al.

(10) Patent No.: US 9,875,123 B2
(45) Date of Patent: Jan. 23, 2018

(54) HOST RESERVATION SYSTEM

(71) Applicant: Red Hat Israel, Ltd., Raanana (IL)

(72) Inventors: Eyal Edri, Tel Aviv (IL); David Caro Estevez, Barcelon (ES)

(73) Assignee: Red Hat Israel, Ltd., Raanana (IL)

(*) Notice: Subject to any disclaimer, the term of this patent is extended or adjusted under 35 U.S.C. 154(b) by 61 days.

(21) Appl. No.: 14/189,662

(22) Filed: Feb. 25, 2014

(65) Prior Publication Data

US 2015/0150001 A1  May 28, 2015

Related U.S. Application Data

(60) Provisional application No. 61/908,607, filed on Nov. 25, 2013.

(51) Int. Cl.
*G06F 9/455* (2006.01)
*G06F 11/36* (2006.01)
*H04L 12/26* (2006.01)
*G06F 9/50* (2006.01)

(52) U.S. Cl.
CPC ........ *G06F 9/45533* (2013.01); *G06F 9/5077* (2013.01); *G06F 11/3688* (2013.01); *H04L 43/50* (2013.01); *G06F 2209/5014* (2013.01)

(58) Field of Classification Search
CPC .................................................. G06F 9/45533
USPC ............................................................ 718/1
See application file for complete search history.

(56) References Cited

U.S. PATENT DOCUMENTS

| | | | | |
|---|---|---|---|---|
| 6,665,701 | B1* | 12/2003 | Combs | G06F 9/5011 709/200 |
| 7,761,538 | B2* | 7/2010 | Lin et al. | 709/220 |
| 8,214,461 | B1* | 7/2012 | Graupner | G06F 9/5011 707/755 |
| 2008/0117898 | A1* | 5/2008 | Davidson et al. | 370/389 |
| 2009/0012930 | A1* | 1/2009 | Jackson | G06F 9/505 |
| 2010/0070230 | A1* | 3/2010 | Kumar et al. | 702/119 |
| 2010/0191881 | A1* | 7/2010 | Tauter | G06Q 10/06 710/104 |
| 2011/0010691 | A1* | 1/2011 | Lu et al. | 717/124 |
| 2014/0274403 | A1* | 9/2014 | Anastasopoulos | A63F 13/795 463/43 |

* cited by examiner

*Primary Examiner* — Wei Zhen
*Assistant Examiner* — Lanny Ung
(74) *Attorney, Agent, or Firm* — Lowenstein Sandler LLP

(57) ABSTRACT

A provisioning server receives a reserve command with a set of criteria and searches for a host matching the criteria. Upon finding such a host, the provisioning server reserves the host for performing a virtualization test. Upon receiving or generating a release command, the provisioning server releases the host.

20 Claims, 3 Drawing Sheets

HOST RESERVATION SYSTEM

CROSS-REFERENCE TO RELATED APPLICATIONS

This application claims priority to U.S. Provisional Patent Application No. 61/908,607, filed Nov. 25, 2013, and hereby incorporated by reference.

TECHNICAL FIELD

Embodiments of the present invention relate to testing virtualization software and systems.

DESCRIPTION OF THE RELATED ART

Testing virtualization software and virtualization systems can be a challenging task. Extensive testing can be particularly difficult in view of the amount of resources used in such testing.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein are systems and methods for allowing a user (such as a developer, testing software, or another human or machine user) to reserve one or more host machines in a virtualization system for testing and to release the host machines when the testing is completed. Thus, the static use of resources is prevented. Further, the system may run more tests than there are available hosts by using the same host sequentially for different tests.

Thus, as an example, (1) a first user can send a request to reserve a host with a particular set of characteristics, (2) a particular host may be identified as having those characteristics and reserved for the first user automatically without specific user involvement, (3) the first user can use the particular host to perform a first test, and (4) the particular host can be released automatically when the first test is completed. Subsequently, (1) a second user can send a request to reserve a host with a particular set of characteristics, (2) the same host may be identified as having those characteristics and reserved for the second user, (3) the second user can use the particular host to perform a second test, and (4) the particular host can be released again for future use by other users. In this way, the single particular host can be used to perform at least two tests.

Figure 1:
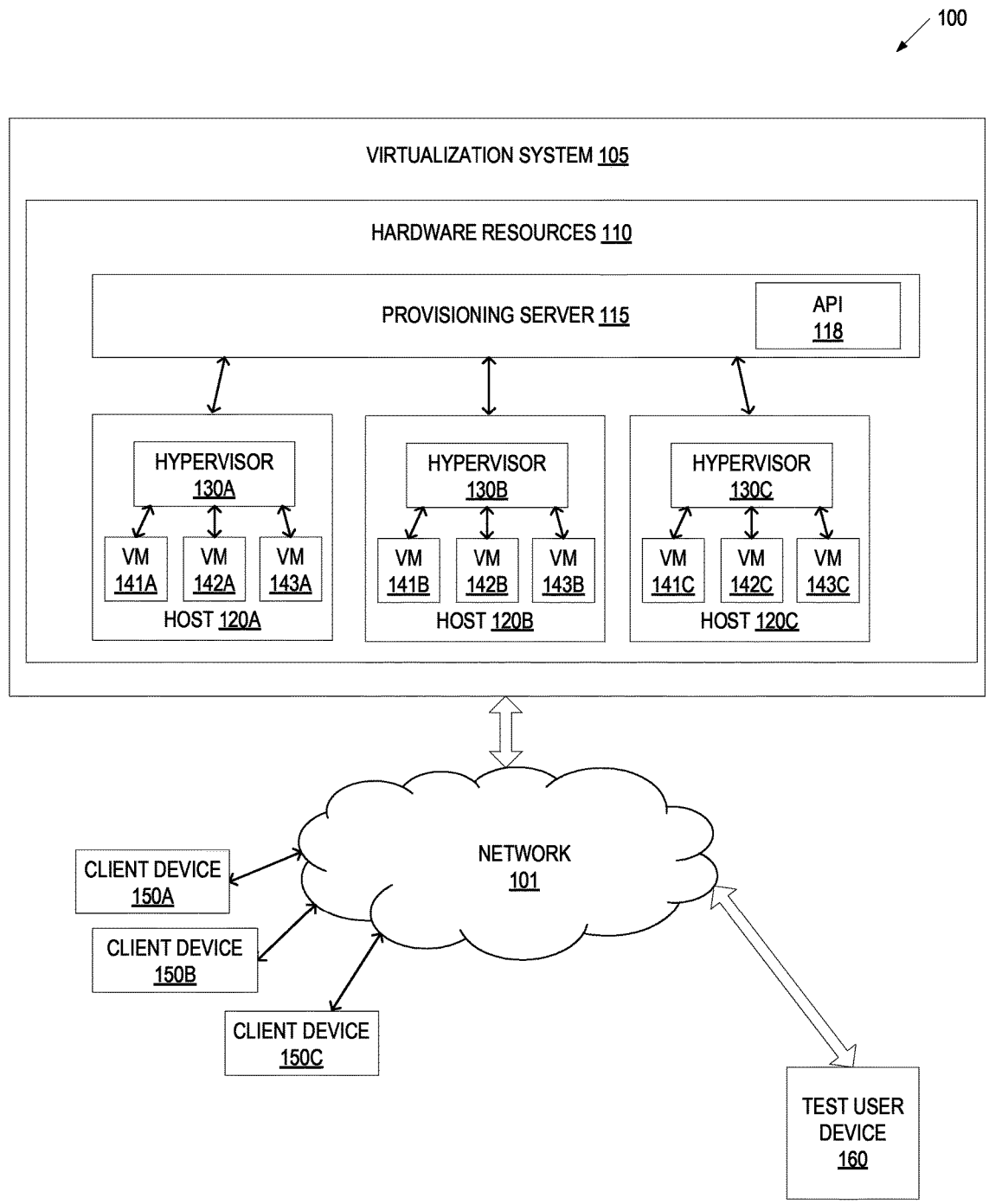
FIG. 1 is a block diagram of an example network architecture in which implementations of the present disclosure can operate.

FIG. 1 is a block diagram of an embodiment of a network architecture 100. The network architecture 100 includes a virtualization system 105 coupled to and accessible over a network 101 by one or more client devices 150A-150C and one or more test user devices 160. The virtualization system 105 includes a variety of hardware resources 110 which may include, for example, desktop computers, laptop computers, rackmount servers, routers, switches, tablet computers, mobile phones, or any other type of computing device. The hardware resources 110 may include one or more processing devices, memory, and/or additional devices such as a graphics card, hardware RAID controller, network controller, hard disk drive, universal serial bus (USB) device, internal input/output (I/O) device, keyboard, mouse, speaker, etc. The hardware resources 110 may be used to execute software, including one or more operating systems, virtual machines, or other applications.

A provisioning server 115 is executed by a portion of the hardware resources 110. The provisioning server 115 manages the hardware resources 110. In particular, the provisioning server 115 manages a number of hosts 120A-120C (or host machines). Typically, the hosts 120A-120C includes a portion of the hardware resources 110. However, in some embodiments hosts 120A-120C may, themselves, be virtual machines executed by the hardware resources 110. The provisioning server 115 can configure the hosts 120A-120C for various versions or operating systems.

The provisioning server 115 includes an API (application programming interface) 118 that can be accessed over the network 101 by a test user device 160 to provide instructions or other data to or receive information from the provisioning server 115.

Each of the hosts 120A-120C may execute a hypervisor 130A-130C. A hypervisor 130A-130C is an application that executes on a host 120A-120C to manage guest virtual machines 141A-143C. In particular, a hypervisor 130A-130C can instantiate or dismiss guest virtual machines 141A-143C or configure them for various versions or operating systems. Each guest virtual machine 141A-143C may execute a guest operating system that can be accessed and used by a guest user 150A-150C over the network 101.

In one embodiment, the hypervisor 130A-130C is a bare-metal hypervisor (or native hypervisor) which executes directly on the hardware resources 110 of the host 120A-120C executing the hypervisor 130A-130C or on the hardware resources 110 allocated to the host 120A-120C executing the hypervisor 130A-130C. In another embodiment, the hypervisor 130A-130C is a hosted hypervisor which is executed by a host operating system executed by the host 120A-120C.

If a developer or other user of the test user device 160 desires to test the virtualization system 105 by instantiating a virtual machine, the test user device 160 could send instructions over network 101 to the API 118 of the provisioning server 115 instructing the provisioning server 115 to instantiate a virtual machine. To accomplish this requested task, the provisioning server 115 may (1) identify a host 120A-120C for executing the virtual machine, (2) identify a MAC (media access control) address to be allocated to the virtual machine, (3) identify storage of the hardware resources 110 on which to store the virtual machine image and data, and (4) execute a hypervisor 130A-130C on the identified host.

The provisioning server 115 may have difficulty identifying available resources (e.g., hosts, MAC addresses, storage, or hypervisors) when instructed to perform a large number of tests. For example, when a test user device 160 submits instructions to perform a test, the provisioning server 115 may be unable to identify an available host 120A-120C to perform the test because they are all in use performing other tests. Thus, when the test user device 160 submits instructions to perform the test, the provisioning server 115 may respond with a message that there are insufficient resources available.

The API 118 of the provisioning server 115 may include functionality to allow a client (such as the test user device 160) to request reservation of a resource (such as a host 120A-120C or a hypervisor 130A-130B) for a limited time and to release the reservation of the resource at a later time. This may prevent static use of resources and allow the virtualization system 105 to respond to additional requests to perform tests from test users.

Figure 2:
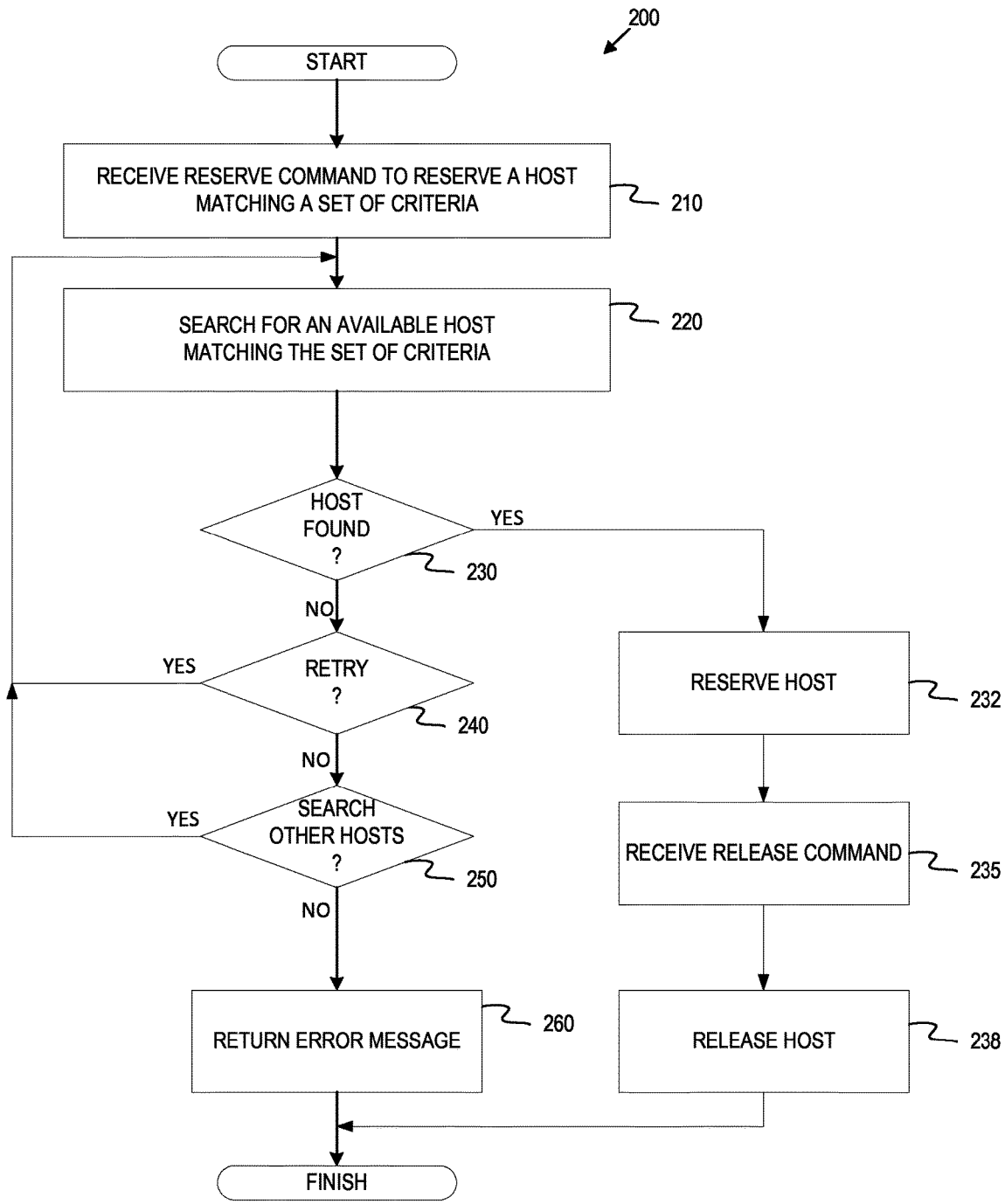
FIG. 2 is a flow diagram of a method of reserving a host in a virtualization system.

FIG. 2 is a flow diagram of a method 200 of reserving a host. The method 200 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, the method 200 may be performed, in part, by processing logic of the provisioning server 115 described above with respect to FIG. 1.

For simplicity of explanation, the method 200 is depicted and described as a series of acts. However, acts in accordance with this disclosure can occur in various orders and/or concurrently and with other acts not presented and described herein. Furthermore, not all illustrated acts may be performed to implement the method 200 in accordance with the disclosed subject matter. In addition, those skilled in the art will understand and appreciate that the method 200 could alternatively be represented as a series of interrelated states via a state diagram or events.

At block 210 of method 200, processing logic receives a reserve command to reserve a host. The reserve command may be received via the API 118 of the provisioning server 115 of FIG. 1 from a client. The reserve command may include search criteria. The search criteria may include, for example, criteria concerning a host name (e.g., the host name begins with "cinteg"), a host class (e.g. the host has been assigned the user-defined host class "alpha"), a CPU (central processing unit) type (e.g., the host has a 32-bit or 64-bit processor), or any other fact or value. In particular, the criteria concerning the host name may specify less than a unique hostname such that the host name criteria can identify more than one host.

The reserve command may include a number of hosts to be reserved. For example, the reserve command may be a request to reserve a single host. As another example, the reserve command may be a request to reserve multiple hosts. In one embodiment, the reserve command may request multiple hosts with multiple, different sets of criteria.

The reserve command may include a reserve reason indicating the purpose of the reserve command. In one embodiment, the reserve reason may be transmitted as a string (e.g., "Jenkins CI test for creating VM"). In another embodiment, the reserve reason may be an indicator provided by a test user (e.g., "low" for low-priority virtual machine testing or "high" for high-priority virtual machine testing). In one embodiment, the reserve command may include a timestamp indicating when the reserve command was transmitted.

The reserve command may also include instructions to configure the reservation as a full provisioning of the reserved host or a quick provisioning of the reserved host. In one embodiment, during a full provisioning, a host operating system is erased and replaced by a fresh installation. In one embodiment, during a quick provisioning, the host operating system will not be reinstalled and its data will be preserved.

At block 220, the processing logic searches for an available host matching the criteria provided in the reserve request, if any were provided. The processing logic may search for an available host by consulting a data structure associating each host with information concerning the host, e.g., the host name, the host class, CPU type, operating system type, etc. Each host may be associated, in the data structure, with a "RESERVED" parameter which is given a first value if the host is available for reservation (e.g., "available" or "false" or "not reserved" or '0' or any other value). If a host is identified that is available and matches any criteria provided in the reserve command, the method moves to block 232 where the processing logic reserves the identified host.

The processing logic may reserve the identified host by changing the "RESERVED" parameter and returning the host name to the client. In one embodiment, the "RESERVED" parameter is changed to a second value indicating that the host is not available for reservation (e.g., "not available" or "true" or "reserved" or '1' or any other value). In another embodiment, the "RESERVED" parameter is changed to the reserve reason provided in the reserve command. An administrator or other user may consult this information to determine the types of tests being performed on the system.

From block 232, the method 200 continues to block 235 where the processing logic receives a release command. In one embodiment, the release command may be received from the client device. For example, the client may send a release command when the test has been performed. In one embodiment, the processing logic sends a request to release when the test has been performed and receives a release command from the user in response to the request. In another embodiment, the release command may be automatically generated after a period of time (e.g., as measured from the timestamp of the reserve command) in order to effectuate automatic management of "stuck hosts," hosts which clients may have neglected to release after reserving or which were not otherwise not released.

At block 238, the processing logic releases the host. The processing logic may release the host by setting the "RESERVED" parameter back to the first value. After reserving the host and before releasing the host, the host is reserved for the user that sent the reserve command. Thus, the user can use the particular host to perform a test, such as instantiating a virtual machine of a particular configuration and testing its operation.

If, at block 230, an available host matching the provided criteria is not found, the method 200 moves to block 240 where the processing logic decides whether to retry searching for a matching host. If the processing logic decides to retry, the method 200 waits a predetermined amount of time and returns to block 220.

The processing logic may decide to retry based on a number of factors. In one embodiment, the processing logic decides to retry a set number of times. That is, the processing logic decides to retry if it has not already retried a set number of times. In another embodiment, the processing logic decides to retry based on an amount of time that has elapsed (e.g., as measured from the timestamp of the reserve command). If the amount of time that has elapsed is less than a threshold amount, the processing logic may decide to retry. In another embodiment, the processing logic decides to retry based on information provided in the reserve command, such as a number of times to retry, an amount of time to retry, or other information.

If the processing logic decides not to retry, the method 200 moves to block 250 where the processing logic decides whether to search additional hosts based on relaxed criteria. For example, the reserve command may indicate a host group and also indicate that the host group is preferred, not necessary. Thus, after failing to find an available host in the host group, the processing logic may search for hosts outside of the host group that match the other criteria.

If the processing logic decides to search additional hosts with relaxed criteria, the method returns to block 220 where the processing logic searches for an available host using the relaxed criteria. If the processing logic decides not to search additional hosts (because all provided criteria are mandatory or because all remaining criteria are mandatory), the method 200 moves to block 260 where the processing logic returns an error message to the client.

Additional operations may be included in other implementations of the method 200. For example, in one embodiment, rather than simply returning to block 220 from block 240, the processing logic implements a queue for retrying the search such that multiple reserve commands are processed in the order they are received (e.g., a FIFO (first in, first out) queue) or based on a provided priority (e.g., a priority queue).

In another embodiment, the provisioning server 115 of FIG. 1 may include a user interface that an administrator or other user can use to manage hosts. For example, the user interface may allow an administrator to release hosts. The administrator may choose to release a host that has been reserved for a long time without being used or that has been reserved for an unimportant or improper reason.

Figure 3:
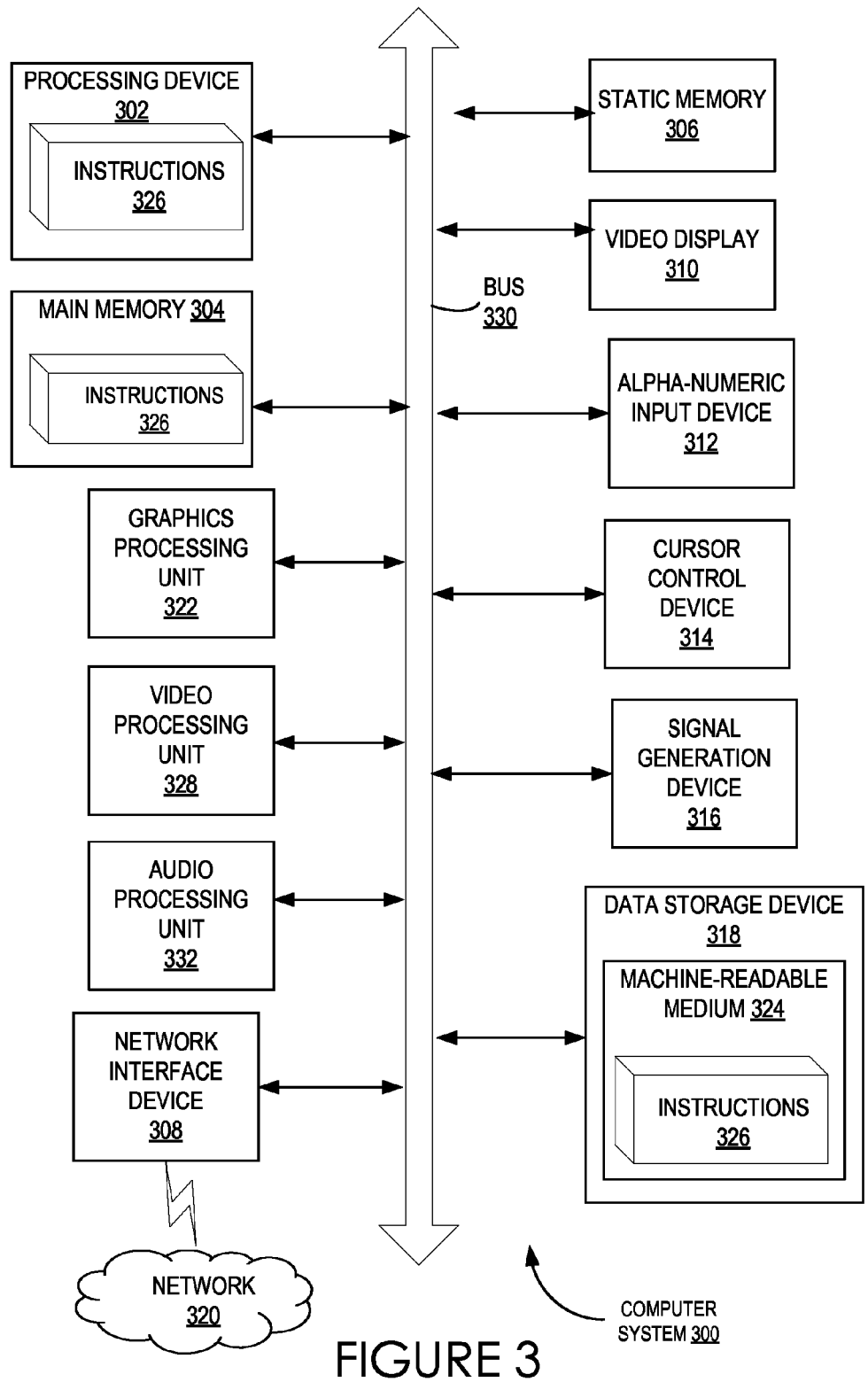
FIG. 3 illustrates a diagrammatic representation of a machine in the exemplary form of a computer system.

FIG. 3 illustrates a diagrammatic representation of a machine in the example form of a computer system 300 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a smartphone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, the operations of provisioning server (as discussed in conjunction with FIGS. 1 and 2) may be included in the instruction block 326 of processing device 302.

The computer system 300 includes a processing device 302, a main memory 304 (e.g., read-only memory (ROM), flash memory, dynamic random access memory (DRAM) (such as synchronous DRAM (SDRAM) or DRAM (RDRAM), etc.), a static memory 306 (e.g., flash memory, static random access memory (SRAM), etc.), and a data storage device 318, which communicate with each other via a bus 330.

Processing device 302 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 302 may also be one or more special-purpose processing devices such as an application specific integrated circuit (ASIC), a field programmable gate array (FPGA), a digital signal processor (DSP), network processor, or the like. In one embodiment, processing device 302 may include one or processing cores. The processing device 302 is configured to execute the instructions 326 of processing logic for performing the operations discussed herein.

The computer system 300 may further include a network interface device 308 communicably coupled to a network 320. The computer system 300 also may include a video display unit 310 (e.g., a liquid crystal display (LCD) or a cathode ray tube (CRT)), an alphanumeric input device 312 (e.g., a keyboard), a cursor control device 314 (e.g., a mouse), a signal generation device 316 (e.g., a speaker), or other peripheral devices. Furthermore, computer system 300 may include a graphics processing unit 322, a video processing unit 328, and an audio processing unit 332. In another embodiment, the computer system 300 may include a chipset (not illustrated), which refers to a group of integrated circuits, or chips, that are designed to work with the processing device 302 and controls communications between the processing device 302 and external devices. For example, the chipset may be a set of chips on a motherboard that links the processing device 302 to very high-speed devices, such as main memory 304 and graphic controllers, as well as linking the processing device 302 to lower-speed peripheral buses of peripherals, such as USB, PCI or ISA buses.

The data storage device 318 may include a computer-readable storage medium 324 on which is stored instructions 326 embodying any one or more of the methodologies of functions described herein. The instructions 326 may also reside, completely or at least partially, within the main memory 304 and/or within the processing device 302 during execution thereof by the computer system 300; the main memory 304 and the processing device 302 also constituting computer-readable storage media.

The computer-readable storage medium 324 may also be used to store instructions 326 utilized by the processing server, such as described with respect to FIGS. 1 and 5, and/or a software library containing methods that call the above applications. While the computer-readable storage medium 324 is shown in an example embodiment to be a single medium, the term "computer-readable storage medium" or, simply, "computer-readable medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "determining", "forwarding", "provisioning", "creating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the method steps. The structure for a variety of these systems will appear as set forth in the description above. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of any future presented claims. Accordingly, the specification and drawings are to be regarded in an illustrative sense rather than a restrictive sense. The scope of the invention should, therefore, be determined with reference to any future claims, along with the full scope of equivalents to which such claims are entitled.

What is claimed is:

1. A method comprising:
    receiving by a processing device of a provisioning server in a virtualization system over a network, a reserve command requesting reservation of a first host matching a first set of criteria, wherein the reserve command comprises data indicative of a reserve reason and instructions indicating whether to configure the reservation as a full provisioning of the first host where a host operating system on the first host is erased and replaced by a new host operating system, or as a quick provisioning of the first host where the host operating system on the first host is not reinstalled, and wherein the first set of criteria comprises a required criterion and a preferred criterion;
    determining, by the processing device of the provisioning server, that the first host matching the first set of criteria is unavailable;
    determining whether to retry searching for the first host using the first set of criteria in view of at least one of a number of attempts or a period of time since the reserved command was received;
    in response to determining not to retry searching for the first host, determining that a second host matching a second set of criteria is available, wherein the second set of criteria comprises the required criterion from the first set of criteria, but not the preferred criterion;
    reserving the second host matching the second set of criteria, wherein reserving the second host matching the second set of criteria generates a reserved host, and wherein reserving the second host matching the second set of criteria comprises determining that the reserve command has priority over a second reserve command in view of the data indicative of the reserve reason;
    performing, by the processing device of the provisioning server, a virtualization test using the reserved host; and
    releasing, by the processing device of the provisioning server, the reserved host.

2. The method of claim 1, wherein reserving the second host comprises changing a reserved parameter to indicate the reserve reason.

3. The method of claim 1, wherein reserving the second host comprises changing a reserved parameter from a first value to a second value and wherein releasing the reserved host comprises changing the reserved parameter from the second value to the first value.

4. The method of claim 1, wherein releasing the reserved host comprises releasing the reserved host in response to receiving a release command.

5. The method of claim 1, wherein determining that the second host is available comprises checking a value of a reserved parameter.

6. The method of claim 1, wherein determining that the second host matching the second set of criteria is available comprises determining that the second host is available and matches at least some of a set of preferred criteria.

7. The method of claim 1, wherein determining that the second host matching the second set of criteria is available comprises:
    searching at a first time for an available host matching the second set of criteria;
    determining, after searching at the first time and before searching at a second time, that no available hosts match the second set of criteria; and searching, at the second time, for an available host matching the second set of criteria.

8. A non-transitory computer-readable medium having instructions encoded thereon which, when executed by a processing device, cause the processing device to:
receive by a processing device of a provisioning server in a virtualization system over a network, a reserve command requesting reservation of a first host matching a first set of criteria, wherein the reserve command comprises data indicative of a reserve reason and instructions indicating whether to configure the reservation as a full provisioning of the first host where a host operating system on the first host is erased and replaced by a new host operating system, or as a quick provisioning of the first host where the host operating system on the first host is not reinstalled, and wherein the first set of criteria comprises a required criterion and a preferred criterion;
determine, by the processing device of the provisioning server, that the first host matching the first set of criteria is unavailable;
determine whether to retry searching for the first host using the first set of criteria in view of at least one of a number of attempts or a period of time since the reserved command was received;
in response to determining not to retry searching for the first host, determine that a second host matching a second set of criteria is available, where the second set of criteria comprises the required criterion from the first set of criteria, but not the preferred criterion;
reserve the second host, wherein reserving the second host generates a reserved host, and wherein to reserve the second host, the processing device is to make a determination that the reserve command has priority over a second reserve command in view of the data indicative of the reserve reason;
perform, by the processing device of the provisioning server, a virtualization test using the reserved host; and
release, by the processing device of the provisioning server, the reserved host.

9. The non-transitory computer-readable medium of claim 8, wherein to reserve the second host, the processing device is to change a reserved parameter to indicate the reserve reason.

10. The non-transitory computer-readable medium of claim 8, wherein to reserve the second host the processing device is to change a reserved parameter from a first value to a second value and wherein to release the reserved host the processing device is to change the reserved parameter from the second value to the first value.

11. The non-transitory computer-readable medium of claim 8, wherein to release the reserved host the processing device releases the reserved host in response to receiving a release command.

12. The non-transitory computer-readable medium of claim 8, wherein to determine that a second host is available, the processing device checks a value of a reserved parameter.

13. The non-transitory computer-readable medium of claim 8, wherein to determine that the second host matching the second set of criteria is available comprises determining that the second host is available and matches some of a set of preferred criteria.

14. The non-transitory computer-readable medium of claim 8, wherein to determine that the second host matching the second set of criteria is available, the processing device further to:
search at a first time for an available host matching the second set of criteria;
determine, after searching at the first time and before searching at a second time, that no available hosts match the second set of criteria; and
search, at the second time, for an available host matching the second set of criteria.

15. A system comprising:
a memory to store information regarding a plurality of hosts;
a processing device, operatively coupled to the memory, to:
receive, over a network, a reserve command requesting reservation of a first host matching a first set of criteria, wherein the reserve command comprises data indicative of a reserve reason and instructions indicating whether to configure the reservation as a full provisioning of the first host where a host operating system on the first host is erased and replaced by a new host operating system, or as a quick provisioning of the first host where the host operating system on the first host is not reinstalled, and wherein the first set of criteria comprises a required criterion and a preferred criterion;
determine that a first host of the plurality of hosts matching a first set of criteria is unavailable;
determine whether to retry searching for the first host using the first set of criteria in view of at least one of a number of attempts or a period of time since the reserved command was received;
in response to determining not to retry searching for the first host, determine that a second host of the plurality of hosts matching a second set of criteria is available, where the second set of criteria comprises the required criterion from the first set of criteria, but not the preferred criterion;
reserve the second host, wherein reserving the second host generates a reserved host, and wherein to reserve the second host, the processing device is to make a determination that the reserve command has priority over a second reserve command in view of the data indicative of the reserve reason;
perform a virtualization test using the reserved host; and
release the reserved host.

16. The system of claim 15, wherein reserving the second host comprises changing a reserved parameter to indicate the reserve reason.

17. The system of claim 15, wherein the processing device is to reserve the second host by changing a reserved parameter associated with the second host in the memory from a first value to a second value and to release the reserved host by changing the reserved parameter from the second value to the first value.

18. The system of claim 15, wherein the processing device is to release the reserved host in response to receiving a release command.

19. The system of claim 15, wherein the processing device is to determine that the second host is available by checking a value of reserved parameter associated with the second host in the memory.

20. The system of claim 15, wherein the processing device is to determine that the second host of the plurality of hosts matching the second set of criteria is available by determining that the second host is available and matches some of a set of preferred criteria.

* * * * *